Sept. 26, 1933.   W. A. MORTON   1,928,600
RECUPERATOR
Filed April 12, 1930

INVENTOR.
William A. Morton
BY
William B. Jaspert
ATTORNEY.

Patented Sept. 26, 1933

1,928,600

UNITED STATES PATENT OFFICE 1,928,600

RECUPERATOR

William A. Morton, Pittsburgh, Pa., assignor to Amco, Incorporated, Pittsburgh, Pa., a corporation of Pennsylvania Application April 12, 1930. Serial No. 443,709

5 Claims. (Cl. 263—15)

This invention relates to recuperators for industrial heating of fuel fired furnaces, and the invention is herein illustrated as an embodiment of a glass melting tank.

In glass melting tanks, a gaseous fuel is employed in reducing the glass batch to a molten condition, and for the sake of economy and efficient combustion, the waste gases are withdrawn from the heating chamber and employed to preheat the air which enters the furnace to support combustion.

In the firing of glass or metal reducing furnaces, it is desirable to prevent the inclusion of solids in the fuel or air supplied for combustion, and the present invention provides for the collection of solids, carried by waste furnace gases in travelling through the superheater toward the recuperator.

Another object of the invention is the provision of mechanical means for accelerating the flow of waste gases through a superheater and recuperator structure.

Another object of the invention is the provision of means for reducing the temperature of waste gases entering the recuperator.

Figure 1:
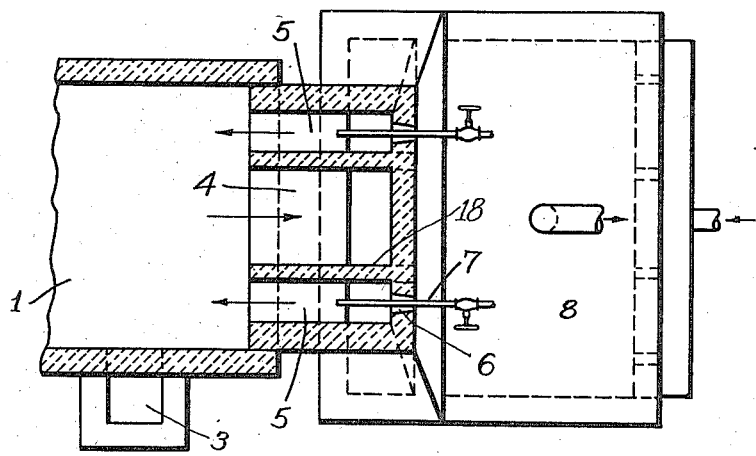
Figure 2:
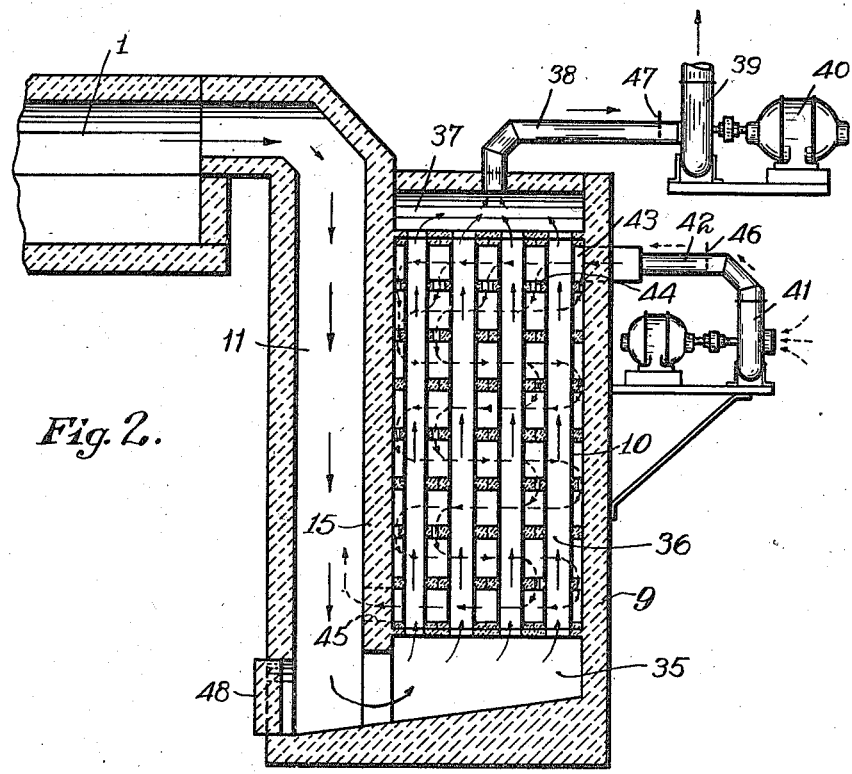

The objects and distinguishing features of the invention will become more apparent from a consideration of the accompanying drawing in which like reference characters designate like parts and in which Fig. 1 is a horizontal section partially in elevation of a portion of a glass tank and a recuperator embodying the principles of this invention; Fig. 2 a vertical cross-section of the structure shown in Figure 1.

With reference to the drawing, the structure therein illustrated, comprises a glass tank 1 having a batch feeder passage 3, a waste gas passage 4, and gaseous fuel passages 5, the passages 4 and 5 leading to the superheater. Burner ports 6 are provided for fuel burners 7 which are adapted to inject a liquid or gaseous fuel in the passages 5 where it is mingled with preheated air to form a combustible mixture which is directed into the heating chamber of the glass tank. The products of combustion are drawn through the central passage 4 leading through the superheater into a recuperator generally designated at 8 and which consists of an outer wall structure 9 and tile checker work structure 10 forming vertical and horizontal flues through which the heat from the waste gases is exchanged with the air passing through the tile and is utilized to support combustion at the gaseous fuel passages 5 of the glass tank.

As shown in Fig. 2, the waste gases are conducted through a vertical passage 11 to the bottom of the recuperator structure and thence upwardly through the passages 36 to a collection chamber 37. The down flow of the waste gases in passage 11 precipitates the solid particles and impurities suspended in the gas causing them to collect at the bottom which may be designated a slag pit.

As shown in Fig. 1, the waste gas flue or passage 11 is disposed centrally of a pair of side flues or passages which are air passages connecting with the ports 5 of the glass tank and the recuperator 8. The passages 11 and 5 are separated by a relatively thin wall structure 18 to provide for a maximum rate of heat exchange between the hot waste gases flowing downwardly through the central passage and the preheated air passing upwardly through the side passages.

The vertical gas passage 11 and air passages 5 constitute in effect a superheater in which the waste gas passes to the bottom 35 of the recuperator, thence through vertical flues 36 to an exhaust chamber 37 which communicates with a passage 38 connected to an exhaust fan 39 that is driven by a motor 40. Air is provided through forced circulation by a blower 41 connected through a conduit 42 to the upper horizontal passage 43 of the tile checker work. The horizontal passages are provided with communicating ports 44 which causes air to travel through tortuous paths to make maximum contact with the hot flues 36 and the heated air is conducted through vertical passages 5 to the burner ports where it commingles with the fuel of the burner nozzles 7 in the manner previously explained.

The recuperator shown in Figs. 1 and 2 provides for positive regulation of the supply of air by operation of the blower 41 and by the regulation provided through dampers 46 and 47. The slag pit at the bottom of the waste gas flue is rendered accessible through the removable block 48 and the recuperator is generally of a simple, compact construction which makes it useful for general application to fuel fired furnaces.

By utilizing a forced draft for withdrawing the waste gases, higher efficiency is obtainable than with a chimney which requires waste heat at about 500° F. to produce adequate draft. The forced draft is more positive and less expensive than a chimney draft.

The long path of the superheater increases the time for the passage of the respective gases through the recuperator, thus protecting the thin tile of the recuperator from excessive heat. The superheater itself may be constructed of relatively inexpensive refractory materials on account of the relatively thicker wall sections.

The slag pit at the bottom of the superheater collects the solid particles suspended in the gases because the velocity of the gases is very much reduced in travelling around the wall 15. By collecting these deposits before they enter the recuperator, the more fragile and multi-passaged tile structure is further protected against injury.

Although several embodiments of the invention have been herein illustrated and described, it will be obvious to those skilled in the art that various modifications may be made in the details of construction without departing from the principles as herein set forth.

I claim:

1. The method of preheating and superheating air which comprises, initially heating the air by passing the air along a series of parallel horizontal paths and passing waste hot furnace gases vertically across said paths to indirectly preheat the air and subsequently passing the preheated air and initial waste furnace gases in superheating conductive proximity in vertical juxtaposed paths of substantially the same length as the first mentioned waste gas paths and in heat exchange relation thereto.

2. The method of preheating and progressively accelerating the heating of air which comprises, initially heating the air by passing it vertically from one to the other of a series of parallel horizontal paths, passing a plurality of vertically disposed streams of heated gases across said air paths to indirectly heat the air, passing a plurality of vertically juxtaposed streams of heated gases of substantial length from a source of heat to a chamber common to the first named streams of heated gases and then passing the preheated air in conductive proximity to the last named streams of heated gases to acceleratively superheat the air along a path of substantially the same length as the first mentioned waste gas paths.

3. In a furnace and recuperator, the combination which comprises a heat exchanger having horizontal air heating passages in superposed relation and connected at alternate sides of a vertical chamber to form a tortuous elongated passageway for the movement of air, a plurality of vertically disposed spaced apart aligned flues for the movement of waste gases in conductive proximity across the air passages, vertical walls enclosing the said air and waste gas passages, air and waste gas openings in a wall of the furnace and flues having a vertical wall common to each of the flues and the heat exchanger and substantially the length of said exchanger connecting the furnace and heat exchanger with the said openings to convey air and waste gases to and from the furnace in conductive proximity for the superheating of air.

4. In a recuperator and air superheater comprising a chamber enclosed by vertical walls, the combination of a plurality of vertical waste gas flues in the recuperator, of horizontal air passages around the waste gas flues, a waste gas chamber beneath the flues and common to them and a plurality of vertically disposed passages connecting the said chamber with a source of waste heat to form in common with a wall of the recuperator a flue for superheating air, along a path substantially the length of the first mentioned waste gas flues.

5. In combination with a furnace of a heat exchanger and a slag pocket interposed between the furnace and heat exchanger to collect solids carried by waste gases, a series of vertical waste gas flues forming an air heating portion of the exchanger, a second series of vertically aligned waste gas flues forming another air heating portion of the exchanger, a slag pocket beneath and common to both series of flues, and partial partition means for causing solids carried by said waste gases to be collected in the said pocket by reversing the direction of flow of the waste gases in the pocket from one direction of vertical travel to another.

WILLIAM A. MORTON.